United States Patent Office 3,300,531
Patented Jan. 24, 1967

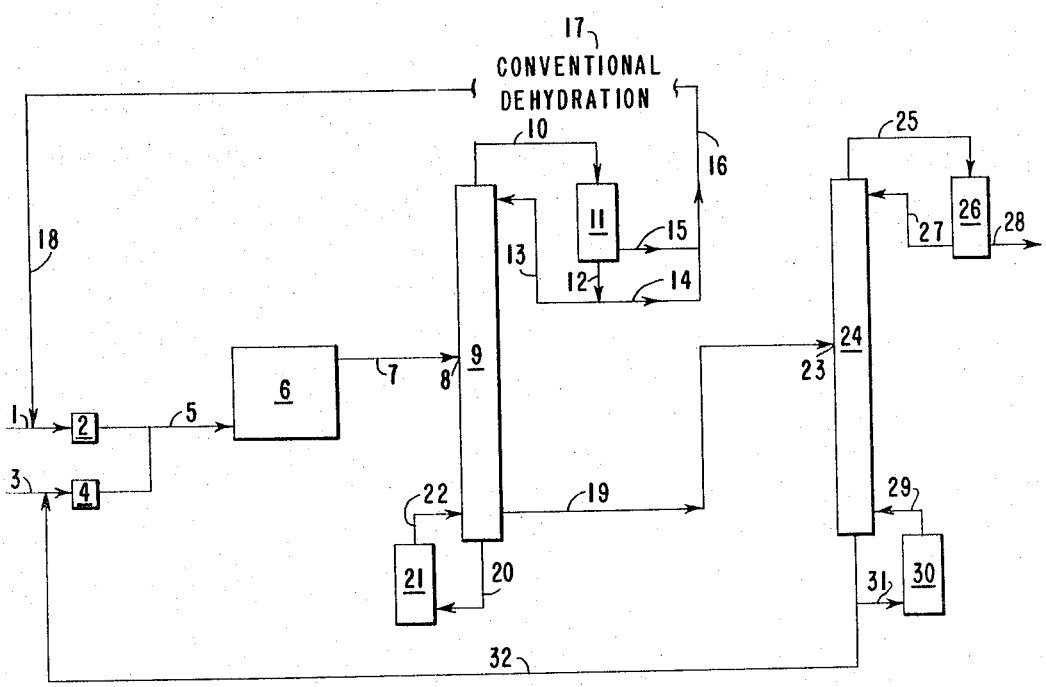

3,300,531
PROCESS FOR PREPARING DIMETHYL-
ACETAMIDE
John A. James, Jr., and Charles J. Kramis, Houston, Tex.,
assignors to E. I. du Pont de Nemours and Company,
Wilmington, Del., a corporation of Delaware
Filed Oct. 4, 1963, Ser. No. 320,946
1 Claim. (Cl. 260—561)

This application is a continuation-in-part of our copending application Serial No. 200,553, filed June 6, 1962, now abandoned, which in turn was a continuation-in-part of our then copending application Serial No. 63,447, filed October 18, 1960, now abandoned, which in turn was a continuation-in-part of our then copending application Serial No. 848,339, filed October 23, 1959, now abandoned.

This invention relates to the preparation of dimethylacetamide, and is more particularly directed to a process for the preparation of dimethylacetamide from acetic acid and dimethylamine which permits improved purification methods.

The art has long appreciated that acetic acid and dimethylamine can be reacted to produce dimethylacetamide. However, the separation of dimethylacetamide from its various reaction impurities has been a cumbersome and expensive procedure unsuited for commercial application.

It has now been found that by reacting dimethylamine, which contains a small quantity of monomethylamine as an impurity, with acetic acid or acetic anhydride under such conditions that a sufficiently high conversion of these reactants to dimethylacetamide is obtained, it becomes economically feasible to recycle unreacted acetic acid as its maximum boiling ternary azeotrope with dimethylacetamide and monomethylacetamide, thereby avoiding the additional costly purification step now used in prior art processes.

The process of this invention is essentially a two-step continuous process, comprising a reaction step and a separation step. In the first step, glacial acetic acid or acetic anhydride and anhydrous dimethylamine and trace amounts of monomethylamine are reacted to yield a reaction product containing dimethylacetamide. In the second step, the dimethylacetamide-containing reaction product from the first step is purified by a distillation procedure which gives a highly effective separation of dimethylamine, water, unreacted acetic acid, and monomethylacetamide from dimethylacetamide. The dimethylacetamide product thus obtained is nearly 100% pure, and contain only very small amounts of water, acetic acid and dimethylamine as impurities.

In the reaction step, glacial acetic acid or acetic anhydride, anhydrous dimethylamine and traces of monomethylamine are reacted continuously at a temperature of from 180° C. to 235° C., and a pressure of from 500 to 700 pounds per square inch gauge. A 50% to 100% excess of dimethylamine, on an equivalence basis, is used. The reaction is carried out in a conventional heat exchanger, under liquid phase conditions, with a residence time of from ½ to 1 hour.

By using these process conditions and a reactor designed to minimize back-mixing of reactants, for example a reactor pipe having a length to diameter ratio of at least 500:1, a 96% to 99% by weight conversion of acetic acid or acetic anhydride to dimethylacetamide can be obtained.

Thus, for example, when using glacial acetic acid and 100% excess dimethylamine, the resultant mixture from the reaction step comprises about 57 weight percent dimethylacetamide, about 1 to 1.5 weight percent acetic acid, about 30% dimethylamine, about 11 weight percent water and about .5 weight percent monomethylacetamide.

The liquid synthesis product is then dropped to approximately atmospheric pressure and fed to near the center of the first of two distillation units, to separate dimethylamine and water from the dimethylacetamide, unreacted acetic acid and monomethylacetamide. The pressure drop is accomplished without substantial heat loss by allowing a portion of the liquid to flash into vapor so as to fully utilize its heat content in the first distillation column. In this way, a partially vaporized feed is provided for the first distillation column. This is desirable because it gives balanced operation of the upper and lower portions of the column.

The first column will normally be operated at atmospheric pressure, or slightly higher, to permit condensation of overhead vapor for reflux with cooling water. Pressures in excess of 50 p.s.i.g. are not economical because of the high bottom column temperatures required. Operating temperatures at preferred atmospheric pressure will be 165° C. to 170° C. at the bottom, 95° C. to 105° C., at the top and 100° C. to 120° C. at the feed point.

Overhead from this first column, containing dimethylamine and water, can be partially or totally condensed, a portion being returned as reflux and the remainder withdrawn for subsequent separation of the water and dimethylamine in a conventional distillation apparatus in which water is discarded and dimethylamine is recycled back to the reactor.

The bottoms from the first column, containing dimethylacetamide, unreacted acetic acid and monomethylacetamide, can be withdrawn either as a liquid or a vapor sidestream. Removal as a liquid is preferred for reasons of economy and convenience. It is preferred to remove the base liquid as a sidestream rather than from the bottom of the column because this allows high boiling impurities to accumulate at the base of the column so that they can be removed by periodic purges.

The bottoms sidestream from the first column is fed, as a liquid or as a vapor, to near the center of the second column to separate the components. Design and operation of the second column is conventional. The acetic acid is removed from the bottom of the column as a maximum boiling ternary azeotrope with dimethylacetamide and monomethylacetamide for recycle to the reactor, and pure dimethylacetamide is removed from the top.

The invention can be better understood by referring to the drawing, which is a flow sheet of the process. Dimethylamine with traces of monomethylamine is fed through pipe 1 and pump 2, and acetic acid or acetic anhydride is fed through pipe 3 and pump 4, into a common pipe 5. Pipe 5 leads into heat exchanger 6, in which the dimethylamine, traces of monomethylamine and acetic acid or acetic anhydride are reacted.

The synthesis product is then fed through pipe 7 to the center 8 of the first distillation column 9. In distillation column 9, water, dimethylamine and monomethylamine are taken off at the top through pipe 10, and are passed into water-cooled condenser 11. Condensate, pipe 12, is split into reflux, pipe 13, and liquid distillate, pipe 14. Overhead vapor need not be totally condensed so a portion of the distillate may be withdrawn as vapor in pipe 15, combined with liquid distillate in pipe 16 and conveyed to a column, unit 17, where water (bottoms) and dimethylamine and monomethylamine (overhead) are separated. The so dehydrated dimethylamine and monomethylamine are then recycled back through pipe 18 to the dimethylamine feed stream.

From the bottom of the distillation column 9 there is removed through pipe 19 a bottoms sidestream containing dimethylacetamide, monomethylacetamide and acetic acid. Unit 21 is a conventional calandria provided to vaporize the liquid effluent, pipe 20, from column 9, and return it as vapor through pipe 22.

The liquid or vapor in pipe 19 is fed to the second column 24 near its midpoint 23. In column 24, pure dimethylacetamide is taken off the top through pipe 25, condensed in water-cooled condenser 26, and split into reflux, pipe 27, and product, pipe 28. The maximum boiling ternary azeotrope of dimethylacetamide, monomethylacetamide and acetic acid is removed through bottom pipe 32. Unit 30 is a conventional calandria to provide column boilup by vaporizing liquid effluent withdrawn from the column in pipe 31 and returning it to the column as vapor in pipe 29.

The maximum boiling ternary azeotrope so removed from column 24 is recycled back to the feed stream of acetic acid 3 for addition into the heat exchanger 6.

The following illustrative examples are submitted so that the invention will be more easily understood and practiced:

*Example 1*

Using an installation patterned after the drawing, 451 lb./hr. of dimethylamine containing 0.1 weight percent of monomethylamine are combined with 225 lb./hr. of recycled dimethylamine and monomethylamine and fed to the pump where the pressure is raised to 600 p.s.i.g. Similarly, 600 lb./hr. of acetic acid and 200 lb./hr. of an acetic acid - dimethylacetamide - monomethylacetamide mixture from the base of the product refining column, containing 18 lb./hr. of acetic acid, 102 lb./hr. of dimethylacetamide and 80 lb./hr. of monomethylacetamide are fed through a second pump and also raised to 600 lb./sq. in.

The effluents from these two pumps are combined and fed into a heat-exchanger type, liquid phase reactor having a holdup time of one hour, at a temperature of approximately 215° C. The product from the reactor, composed of 973 lb./hr. of dimethylacetamide, 180 lb./hr. of water, 224.8 lb./hr. of dimethylamine, 80 lb./hr. of monomethylacetamide and 18 lb. of acetic acid is adiabatically dropped from 600 p.s.i.g. to approximately atmospheric pressure, whereby the liquid is partially vaporized.

This is fed to the center of the first of two distillation columns at approximately 120° C. The vapor from the top of the column is partially condensed in a water-cooled unit, and a portion of the liquid condensate is returned to the distillation column as reflux. The remainder of the liquid condensate is combined with uncondensed vapor and fed to a conventional distillation apparatus for dehydration of the dimethylamines.

The material from the base of the first column is fed to a calandria for vaporization. The vapors, at 175° C., are returned to the base of the column.

A liquid sidestream consisting of 973 lb./hr. of dimethylacetamide, 18 lb./hr. of acetic acid, 80 lb./hr. of monomethylacetamide and 0.02 lb./hr. of water is removed from the bottom plate of the column. This liquid is fed to near the center of the second distillation column, which is operating at 400 mm. of mercury absolute pressure. Overhead vapor at 143° C. is condensed in a water-cooled unit. Eighty percent of the condensate is returned to the column as reflux and the remainder, consisting of 871 lb./hr. dimethylacetamide, 0.2 lb./hr. acetic acid, 0.01 lb./hr. dimethylamine and 0.2 lb./hr. of water, is withdrawn as finished product.

The liquid effluent from the bottom of the second column is split into two streams, one portion being recycled back to the reactor and the remainder being sent to a calandria for vaporization to supply column boilup at 175° C.

*Example 2*

A process identical to that described in Example 1 is run, except that the sidestream from the first column is removed as a vapor. The remaining process conditions are the same, as is the product.

The embodiments of the invention in which an exclusive property or privilege is claimed are:

In a process for preparing dimethylacetamide by reacting a compound selected from the group consisting of acetic acid and acetic anhydride with an amount of dimethylamine in excess of the stoichiometric requirement and then separating the resulting dimethylacetamide from the reaction byproducts and unreacted reactants by sequential fractional distillation, the steps of conducting the reaction in the presence of monomethylamine and monomethylacetamide at a temperature of from 180° C. to 235° C. and a pressure of 500 to 700 p.s.i.g. for a period of from ½ to 1 hour, withdrawing a stream from the reaction zone containing dimethylacetamide, monomethylacetamide, reaction byproducts, and unreacted reactants, introducing said stream into the distillation zone, and recycling the unreacted acetic acid separated during said distillation to the reaction zone as its maximum boiling ternary azeotrope with dimethylacetamide and monomethylacetamide.

References Cited by the Examiner

UNITED STATES PATENTS

| | | | |
|---|---|---|---|
| 2,667,451 | 1/1954 | Larson | 260—561 |
| 2,667,511 | 1/1954 | Downing | 260—561 |

OTHER REFERENCES

Ruhoff et al., Jour. American Chem. Soc., volume 59, pp. 401–402 (1937).

N. S. MILESTONE, *Primary Examiner.*

N. TROUSOF, *Assistant Examiner.*